United States Patent

[11] 3,611,428

[72] Inventor Ernest J. Okleshen
Fort Wayne, Ind.

[21] Appl. No. 778,166
[22] Filed Nov. 22, 1968
[45] Patented Oct. 5, 1971
[73] Assignee The Magnavox Company
Fort Wayne, Ind.

[54] ADJUSTMENT FOR FACSIMILE RECEIVER HAVING A PLURALITY OF WRITING STYLI
4 Claims, 9 Drawing Figs.

[52] U.S. Cl. .......... 346/139
[51] Int. Cl. .......... G01d 15/20
[50] Field of Search .......... 346/139, 141; 178/6.6, 8, 11, 14

[56] References Cited

UNITED STATES PATENTS

| | | | |
|---|---|---|---|
| 2,677,589 | 5/1954 | Johnsen .......... | 346/139 |
| 2,850,350 | 9/1958 | Wise et al. .......... | 346/139 |
| 3,325,821 | 6/1967 | Reese et al. .......... | 346/141 X |

*Primary Examiner*—Joseph W. Hartary
*Attorney*—Richard T. Seeger

ABSTRACT: In a facsimile receiver having a plurality of writing styli which should be positioned in the same angular relation as the scanning elements of the associated facsimile transmitter, positioning of one or more of the styli is accomplished by pivoting the stylus to be adjusted on an eccentric which can be rotated until the stylus has the desired angular position, and the eccentric then locked in this position.

INVENTOR
ERNEST J. OKLESHEN
BY Jeffers and Young
ATTORNEYS

INVENTOR
ERNEST J. OKLESHEN

BY Jeffers and Young
ATTORNEYS

INVENTOR
ERNEST J. OKLESHEN

BY Jeffers and Young
ATTORNEYS

INVENTOR
ERNEST J. OKLESHEN
BY Jeffers and Young
ATTORNEYS

ADJUSTMENT FOR FACSIMILE RECEIVER HAVING A PLURALITY OF WRITING STYLI

BACKGROUND OF THE INVENTION

My invention relates to a facsimile receiver having a plurality of writing styli, and particularly an improved adjustment for accurately positioning the writing styli in the desired angular relation in the facsimile receiver.

In one type of facsimile receiver, the document to be reproduced is positioned on a concave surface extending parallel to a longitudinal axis of the receiver. A plurality of writing styli are rotated about this longitudinal axis to produce writing or markings on the document. The writing styli rotate in synchronism with the scanning apparatus of a facsimile transmitter, and the received electrical signals from this transmitter cause the writing styli to produce marks on the document to reproduce the document being scanned at the transmitter. Typically, the document being scanned and being reproduced extends around the longitudinal axis for less than 180°. In order to increase the number of lines scanned per unit time and to decrease the time required to scan and reproduce a given document without increasing the mechanical scanning speed, two scanning systems and two writing styli have been utilized. Thus, the document at the facsimile transmitter is scanned alternately by each of the two scanning systems, and the document at the facsimile receiver is reproduced by the corresponding writing stylus. In order that the reproduced document be as an exact copy of the original document as possible, the two writing styli should be accurately positioned in the same angular relation as the two scanning systems. Typically, the scanning systems are positioned 180° apart on their circle of rotation, so that the writing styli should also be positioned 180° apart on their circle of rotation. The ability to uniformly adjust and maintain this exact angular relationship provides interchangeability between different facsimile equipments overcoming the need to further adjust an individual receiver in a given facsimile system with its corresponding transmitter to obtain optimum performance.

Accordingly, an object of my invention is to provide an improved adjustment for accurately positioning a plurality of writing styli at the desired angular relation in a facsimile receiver.

Another object of my invention is to provide an improved facsimile receiver having means which permit the writing styli to be accurately positioned in the desired angular relation.

The problem of accurately positioning the styli has been recognized for some time. But as of the time of my invention, there was no simple and effective means available for accurately positioning the styli in the desired angular relation. Normally, this was accomplished by positioning the entire transducer assembly, of which the stylus was a part; however, such receivers were and are relatively expensive to construct, and a considerable amount of time is required to accurately position the styli in the desired angular relation.

Accordingly, another object of my invention is to provide an improved adjustment for accurately and easily positioning a writing stylus in a facsimile receiver.

Another object of my invention is to provide a facsimile receiver having simple and inexpensive means for adjusting the writing styli in the desired angular relation.

Another object of my invention is to provide an adjustment for accurately positioning a writing stylus in a facsimile receiver without the need to accurately position the writing transducer itself.

In facsimile receivers where reproduction depends upon pressure of the writing stylus against the copy material, it is desirable to be able to position the styli along their circle of scanning rotation with little or no resulting effect upon the spacing of the styli from the copy material so as not to degrade quality of the reproduced document.

Accordingly, still another object of my invention is to provide in a facsimile receiver an improved adjustment for accurately positioning a plurality of writing styli at the desired angular relation with relatively small or negligible change in the dimensional spacing between the styli and the copy material.

SUMMARY OF THE INVENTION

Briefly, these and other objects are achieved in accordance with my invention in a facsimile receiver having a plurality of writing styli, for example two. The writing styli are positioned on the rotating structure of the facsimile receiver at approximately the desired angular position. In accordance with my invention, one or more of the writing styli are pivoted on an eccentric structure. This eccentric structure can be rotated so that the writing stylus is positioned at precisely the desired angular location, after which the eccentric structure can be locked. The eccentric structure is simple in construction, but permits the writing stylus to be accurately positioned on its circle of rotation without appreciably affecting its radial location with respect to the longitudinal axis of rotation.

BRIEF DESCRIPTION OF THE DRAWING

The subject matter which I regard as my invention is particularly pointed out and distinctly claimed in the claims. The structure and operation of my invention, together with further objects and advantages, may be better understood from the following description given in connection with the accompanying drawing, in which:

DESCRIPTION OF THE PREFERRED EMBODIMENT

Figure 1:
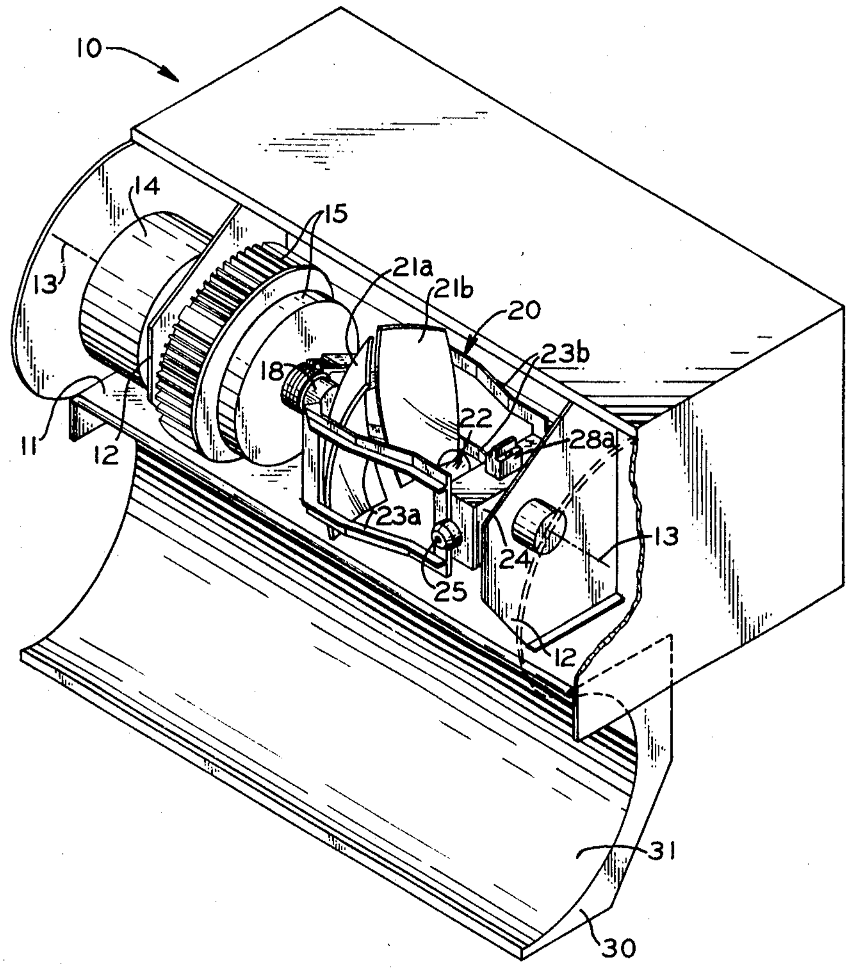
FIG. 1 shows a perspective view of a facsimile receiver which can utilize the improves stylus adjustment in accordance with my invention.

In FIG. 1, I have shown a facsimile receiver 10 which can utilize the writing stylus adjustment in accordance with my invention. The receiver 10 shown in FIG. 1 may also include scanning apparatus for scanning a document and producing electrical signals to be utilized by a receiver at a distant location. The facsimile receiver 10 is mounted on a suitable base 11 which supports a plurality of brackets 12. The brackets 12 support a rotating structure for writing (and also for scanning if the facsimile receiver 10 is used to transmit). This rotating structure rotates about a longitudinal axis 13 and comprises a stationary electric drive motor 14. The output from the drive motor 14 is coupled to speed-reducing and synchronizing gears 15. The output from the gears 15 is derived at an output shaft 18 which rotates about the longitudinal axis 13. A yoke structure generally designated by the numeral 20 is connected to the output shaft 18. If the facsimile receiver 10 is used as a transmitter, then the yoke structure 20 may comprise two concave mirrors 21*a*, 21*b* which are symmetrically positioned about the longitudinal axis 13 and which receive light from an incandescent lamp 22 whose filament is centered as nearly as possible on the longitudinal axis 13. A set of arms 23*a*, 23*b* extend from the output shaft 18 around the mirrors 21*a*, 21*b* towards the right, as viewed in FIG. 1, and connect with a mounting block 24. The mounting block 24 rotates with the yoke structure 20, and if the facsimile receiver 10 is used as a transmitter, carries two scanning-lens systems or arrangements 25 (only one of which is visible in FIG. 1), and two writing styli 28a, 28b (stylus 28b is not visible). The facsimile scanner 10 also includes a cover member 30 which is pivotally or otherwise attached to the base 11 to permit the cover member 30 to be positioned around the rotating structure of the receiver 10. The cover member 30 has a concave (preferably partially cylindrical) platen 31 that receives the paper or copy material to be written upon. When the platen 31 is in its proper position, it curves around the rotating structure and is parallel to the longitudinal axis 13. The platen 31 includes means (not shown) for moving the document being written upon parallel to the longitudinal axis 13.

Figure 2:
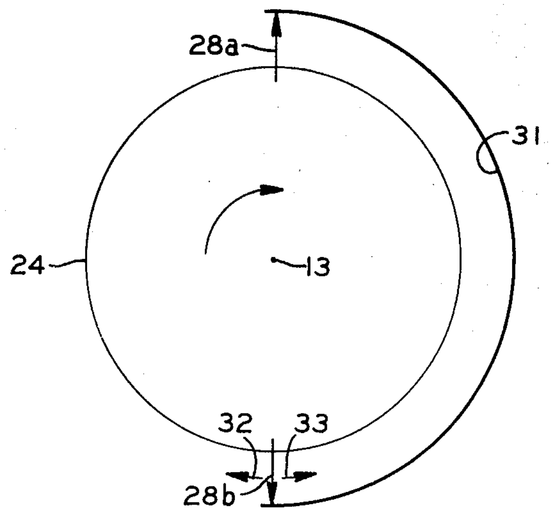
FIG. 2 shows a diagrammatic view illustrating how one of two writing styli can be adjusted.

With respect to FIG. 2, when the platen 31 and a document are in operating position, and when the rotating structure is rotating about the longitudinal axis 13 in the direction indicated in FIG. 2, the two styli 28a, 28b respectively move over the document on the platen 31. The styli 28a, 28b are moved outward against the document at selected times during their rotation, so as to produce marks on the document in response to electrical signals from a facsimile transmitter. In order that the document being reproduced by the facsimile receiver be a faithful and accurate reproduction of the document being transmitted, the writing styli 28a, 28b should have a precise angular relation with respect to each other and with respect to the scanning lens systems of the facsimile transmitter. If the facsimile system utilizes two scanning-lens systems, then two writing styli would also be used. Typically, two lens systems and styli are used. Hence, in order to provide compatibility between different facsimile transmitters and receivers, the lens systems and the writing styli should be accurately positioned 180° apart on their mounting block 24. This angular relation can be provided by moving one of the styli 28a, 28b, the stylus 28b for example, along the circle of rotation in either the direction indicated by the arrow 32 or by the arrow 33 until the stylus 28b is precisely and accurately 180° from the stylus 28a. Persons skilled in the art have recognized this problem for some time, and have devised various facsimile receivers having means for adjusting one of the two styli 28a, 28b. My invention is a new and improved adjustment for moving one of the two writing styli 28a, 28b. FIGS. 3 through 9 show a stylus and housing constructed in accordance with my invention for permitting the stylus to be adjusted around its circle of rotation with relative ease and accuracy.

Figure 4:
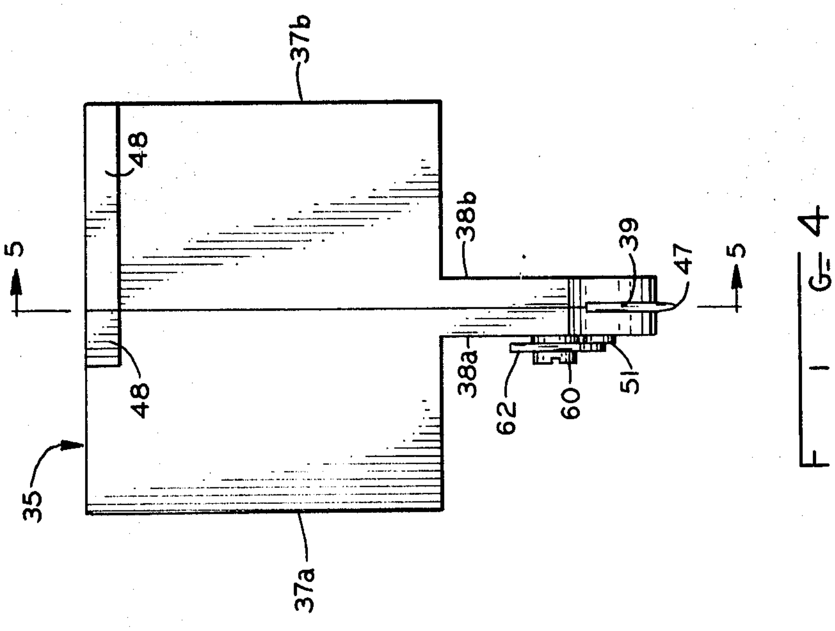
FIG. 4 shows an end elevation view of the stylus housing and my improved adjustment of FIG. 3.
Figure 3:
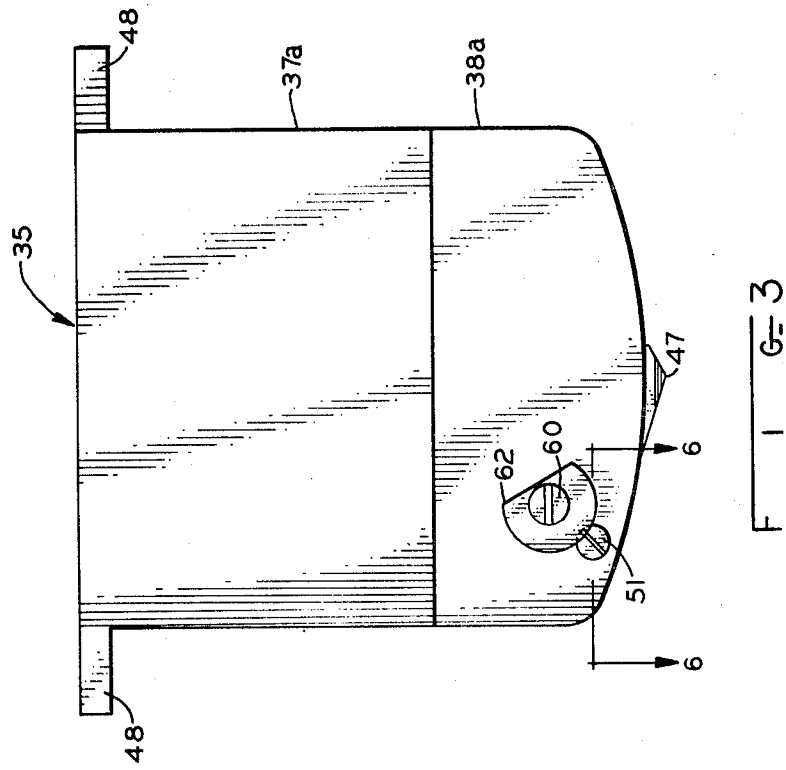
FIG. 3 shows a side elevation view of a stylus housing provided with the improved stylus adjustment in accordance with my invention.

FIGS. 3 and 4 show side and end elevation views of a stylus and transducer housing 35 having an improved adjustment in accordance with my invention for use with a facsimile receiver such as shown in FIG. 1. The housing 35 is preferably constructed from two similar and complementary halves. The complementary halves of the housing 35 comprise upper portions 37a, 37b, and lower portions 38a, 38b. These portions 37a, 37b, 38a, 38b provide a narrow slot 39 having the general shape indicated in the cross-sectional view of FIG. 5. The slot 39 receives a stylus-actuating armature 40, which carries a magnetic coil or winding which, when energized, reacts with a magnetic field (such as provided by permanent magnets) to cause the armature 40 to move in a downward direction as viewed in FIG. 5. A stylus 44 is pivotally positioned in the slot 39 in the lower portions 38a, 38b, and is pivoted on a pivot 45 and urged in an upward direction by a spring 46. The lower end 41 of the armature engages or rests on the end of the stylus 44 near its writing point 47. When the magnetic winding on the armature 40 is energized by an electrical signal from a distant facsimile transmitter, the armature 40 is moved in a downward direction, as viewed in FIG. 5. This movement causes the writing point 47 of the stylus 44 to press against the document and leave a mark. The mark can be provided by carbon paper which is pressed against the document, or by other suitable means. When the magnetic winding of the armature 40 is deenergized, the spring force on the stylus 44 permits the stylus point 47 to move upward. The stylus housing 35 may be attached to the block 24 of FIG. 1 in any suitable manner, as for example by the flanges 48 positioned on the upper portions 37a, 37b. However, if only the flanges 48 are used to position the stylus housing 35, persons skilled in the art will appreciate that it is very difficult to accurately position the stylus housing 35 and the stylus point 47 at precisely the desired angular relation with respect to the other stylus being carried by the block 24 in FIG. 1. Therefore, in accordance with my invention, I provide improved means for moving the pivot 45 of the stylus 44.

Figure 8:
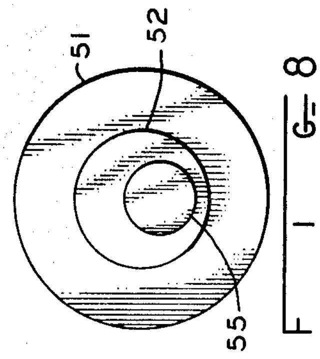
FIG. 8 shows an opposite end view of my stylus adjustment of FIG. 6.
Figure 6:
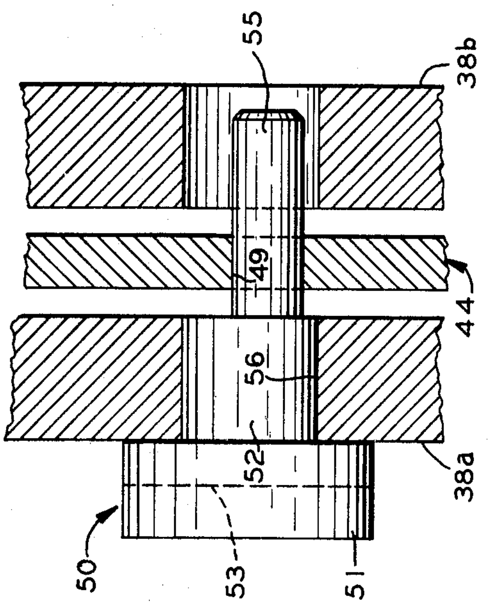
FIG. 6 shows an enlarged cross-sectional view of the improved adjustment in accordance with my invention taken along the line 6—6 in FIG. 3.
Figure 7:
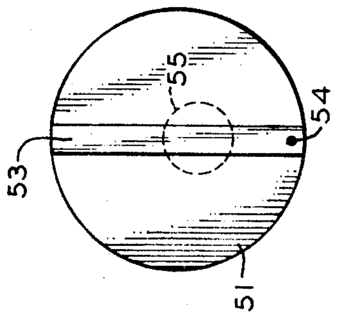
FIG. 7 shows an end view of my stylus adjustment of FIG. 6.
Figure 9:
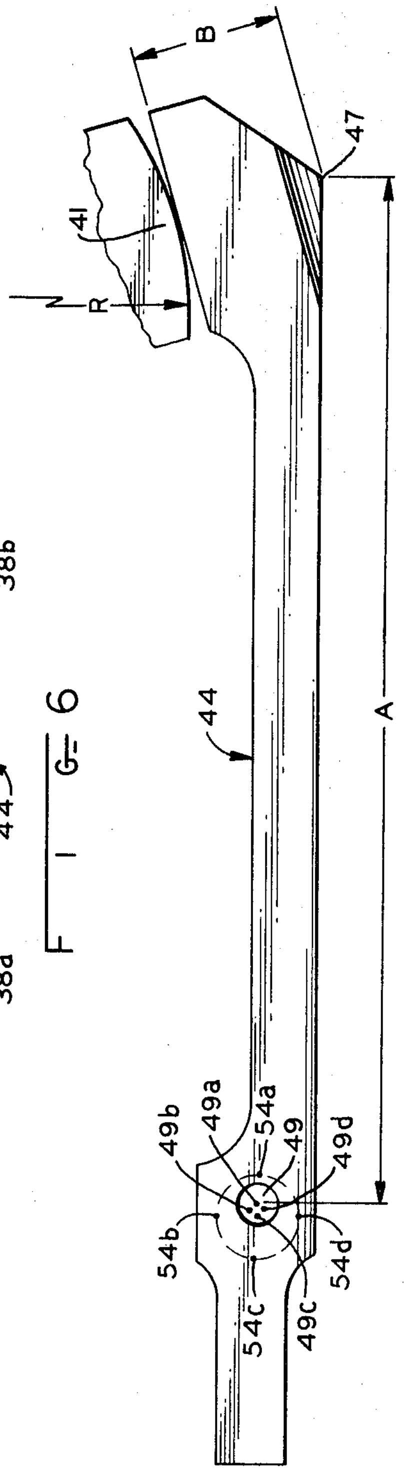
FIG. 9 shows an enlarged view of a stylus with diagrams illustrating the adjustment provided to the stylus in accordance with my invention.

FIGS. 6, 7, and 8 show one embodiment in accordance with my invention for providing an eccentric adjustment for the pivot 45 of the stylus 44. This eccentric adjustment comprises an adjustment member 50 having an adjustment head 51 and a concentric cylindrical mounting shaft 52. The adjustment head 51 is preferably provided with a slot 53 to receive a screwdriver or other tool, and with an index mark 54 to provide an indication of the rotational position of the adjustment member 50. The mounting shaft 52 fits relatively snugly in a cylindrical hole 56 in the lower portion 38a of the housing 35. A cylindrical eccentric shaft 55 extends from the mounting shaft 52, and has a diameter that is slightly less than the diameter of the pivot hole 49 of the stylus 44. FIG. 8 shows how the eccentric shaft 55 is offset with respect to the concentrically positioned adjustment head 51 and mounting shaft 52. Thus, as the head 51 is rotated, the eccentric shaft 55 moves eccentrically about the center of the head 51 and the mounting shaft 52. In FIG. 9, I have shown the movement provided by the adjustment member 50. If the index mark 54 is at the position of the dot 54a, then the pivot hole 49 is centered at the point 49a, and the stylus 44 is pivoted at the point 49a. If the head 51 is rotated so that the index mark 54 is at the position of the dot 54b, then the pivot hole 49 is centered at the point 49b, and the stylus 44 is pivoted at the point 49b. If the head 51 is rotated so that the index mark 54 is at the position of the dot 54c, then the the pivot hole is centered at the point 49c, and the stylus 44 is pivoted at the point 49c, And finally, if the head 51 is rotated so that the index mark 54 is at the position of the dot 54d, then the pivot hole is centered at the point 49d, and the stylus 44 is pivoted at the point 49d. It is to be understood that the index mark 54 may be positioned at any point on the dashed circle indicated in FIG. 9, and that the stylus 44 will then have a pivot point at a corresponding position on the circle passing through the points 49a, 49b, 49c, 49d.

Figure 5:
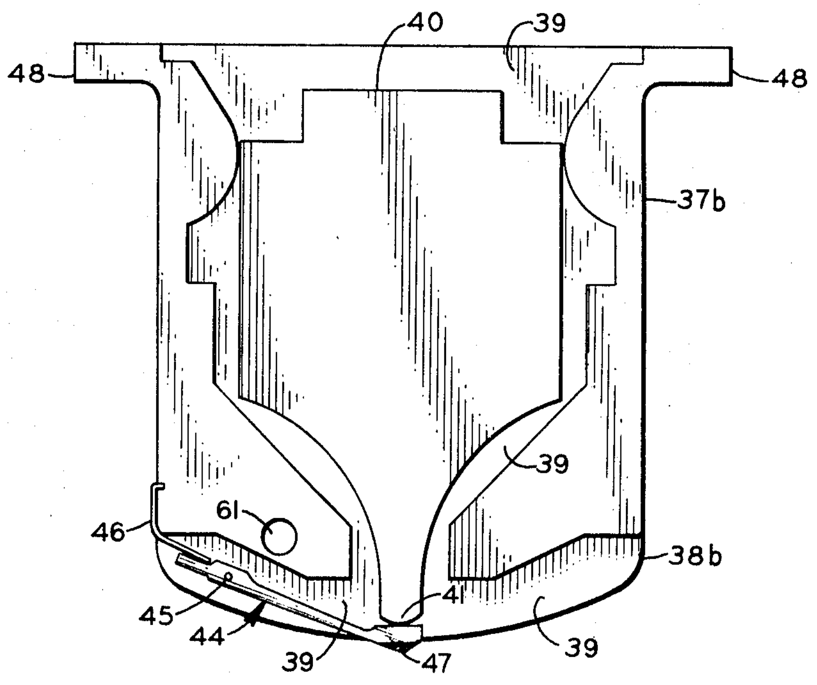
FIG. 5 shows a cross-sectional view of the stylus housing and my adjustment taken along the line 5—5 in FIG. 4.

The eccentric movement provided by the adjustment member 50 is ideal for a stylus such as the stylus 44 shown in FIGS. 5 and 9. This eccentric movement causes the stylus point 47 to move primarily in a desired direction of adjustment along its circle of rotation, as indicated by the arrows 32, 33 in FIG. 2, but causes very little undesired movement of the stylus point 47 in a radial direction toward or away from the longitudinal axis 13 of the facsimile receiver. This is because of the relatively long distance between the pivot hole 49 and the stylus point 47, and the relatively short distance between the lower end 41 of the armature 40 and the stylus point 47. As an example, one embodiment of the adjustment member 50 was constructed in accordance with my invention having stylus dimensions A and B (FIG. 9) of 0.655 inch and 0.100 inch respectively, and with a radius R (FIG. 9) on the lower end 41 of the armature of 0.531 inch. The eccentric shaft 55 was offset 0.005 inch from the center of the adjustment member 50. This construction provided the desired adjustment of plus or minus 0.005 inch along the circle of rotation, with only 0.0001 inch radial movement with respect to the circle of rotation. Thus, the adjustment does not appreciably affect the radial position of the stylus point 47.

It will thus be seen that my invention provides a new and improved adjustment for writing styli for use on facsimile receivers. With respect to FIGS. 3 and 4, once the stylus point 47 has been accurately positioned by rotation of the head 51, this position can be held and locked by a suitable shoulder washer 62 and clamping screw 60 which can be threaded into lower portions 38a, 38b to hold the head 51 in the desired position. Thus, a stylus can be easily adjusted in accordance with my invention by a relatively unskilled person after the facsimile machine has been assembled. If the location of the stylus point is disturbed or needs changing, this can be accomplished by a relatively unskilled person in the field. While I have shown only one embodiment of my invention, persons skilled in the art will appreciate that modifications may be made. For example, the mounting shaft 52 may be eccentrically positioned and the adjustment head 51 and the eccentric shaft 55 may be concentric. However, I prefer that the shaft 55 be eccentrically positioned relative to the other members. Various clamping devices may be used for the adjustment member 50, and various types of actuating means may be substituted for the slot 53. In another variation, the eccentric shaft 55 may be just long enough to accommodate the stylus 44, and another concentric mounting shaft positioned at the end of the eccentric shaft 55 to be supported in a cylindrical hole in the other lower portion **38*b*. In this case, the diameter of the eccentric shaft 55 and the pivot hole 49 would have to be at least as great as the diameter of the added mounting shaft so that the pivot hole could clear or pass over the mounting shaft. Finally, the cylindrical hole 56 may be threaded to accept an adjustment member 50 having a threaded mounting shaft 52 and locking may be accomplished using a separate locking nut on the shaft or the housing 38*a* may contain an insert of nylon or other type locking material which bears against the threaded shaft 52** to prevent undesired movement of the adjustment member after it has been properly positioned. Therefore, while my invention has been described with reference to a particular embodiment, it is to be understood that modifications may be made without departing from the spirit of the invention or from the scope of the claims.

What I claim as new and desire to secure by Letters Patent of the United States is:

1. In a facsimile receiver having a rotating yoke structure that carries at least two spaced styli positioned on a circumference for receiving electrical signals and providing indications on a document positioned near said rotating yoke structure in response to said received electrical signals, an improved arrangement for positioning one of said styli at a selected position on said circumference with respect to the other of said styli, said improved arrangement comprising:

a. a stylus comprising a marking portion and a pivot portion having a pivot hole therethrough;

b. a stylus housing adapted to be mounted on a rotating yoke structure, said housing having an opening for receiving said stylus in an operative position;

c. and an adjustable eccentric member mounted on said stylus housing and passing through said stylus pivot hole, whereby the rotational position of said eccentric member determines the position of said stylus marking portion on its circumference of rotation.

2. The improved positioning arrangement of claim 1, and further comprising means attached to said stylus housing for locking said adjustable eccentric member in a selected rotational position, whereby the position of said stylus marking portion is locked with respect to the circumference.

3. For use with a facsimile-receiving machine having a yoke structure that rotates about a rotational axis, a platen for carrying a document positioned adjacent said yoke structure, and at least two operable styli positioned on said yoke structure at selected relative positions on a circle of rotation centered on said rotational axis, said operable styli being positioned in respective housings mounted on said yoke structure for receiving electrical signals and causing marks to be produced on a document positioned on said platen, at least one of said housings comprising:

a. a stylus-receiving portion having a cylindrical hole therein;

b. an adjustment member having a longitudinal axis, an adjustment head concentrically positioned on said longitudinal axis, a cylindrical mounting shaft concentrically positioned on said longitudinal axis adjacent said head, and an eccentric shaft eccentrically positioned on said longitudinal axis adjacent said mounting shaft;

c. said adjustment member being mounted on said one housing with said mounting shaft positioned in said cylindrical hole;

d. and an elongated stylus having a circular pivot hole and a writing portion positioned in said stylus-receiving portion with said eccentric shaft of said adjustment member passing through said stylus pivot hole so that the rotational position of said adjustment member determines the pivot center of said stylus on its circle of rotation.

4. The improved housing of claim 3, and further comprising means mounted on said one housing for locking said adjustment head in a selected rotational position.